M. J. & P. P. ADAMS.
WHEEL.
APPLICATION FILED MAR. 25, 1908.
916,402.
Patented Mar. 30, 1909.
3 SHEETS—SHEET 1.
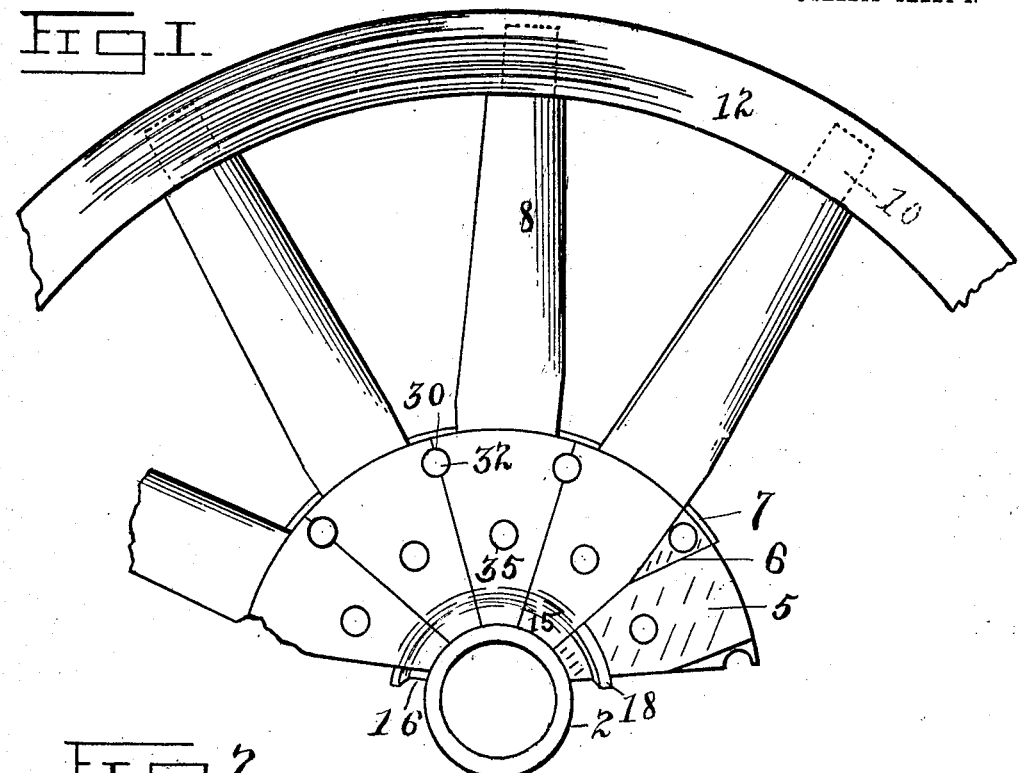
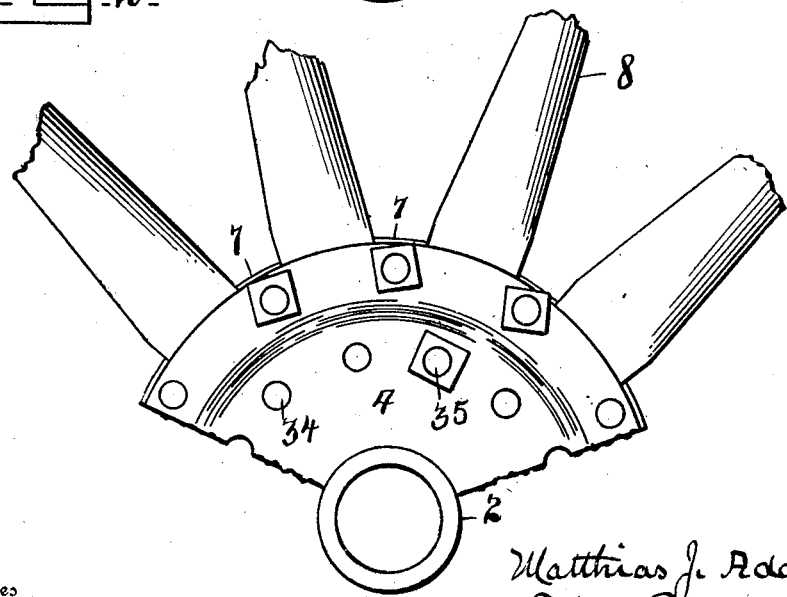
Witnesses
C. E. Pegg
W B Keogh
Inventors
Matthias J. Adams
Peter P. Adams
By M. M. Cady
Attorney M. J. & P. P. ADAMS.
WHEEL.
APPLICATION FILED MAR. 25, 1908.
916,402.
Patented Mar. 30, 1909.
3 SHEETS—SHEET 2.
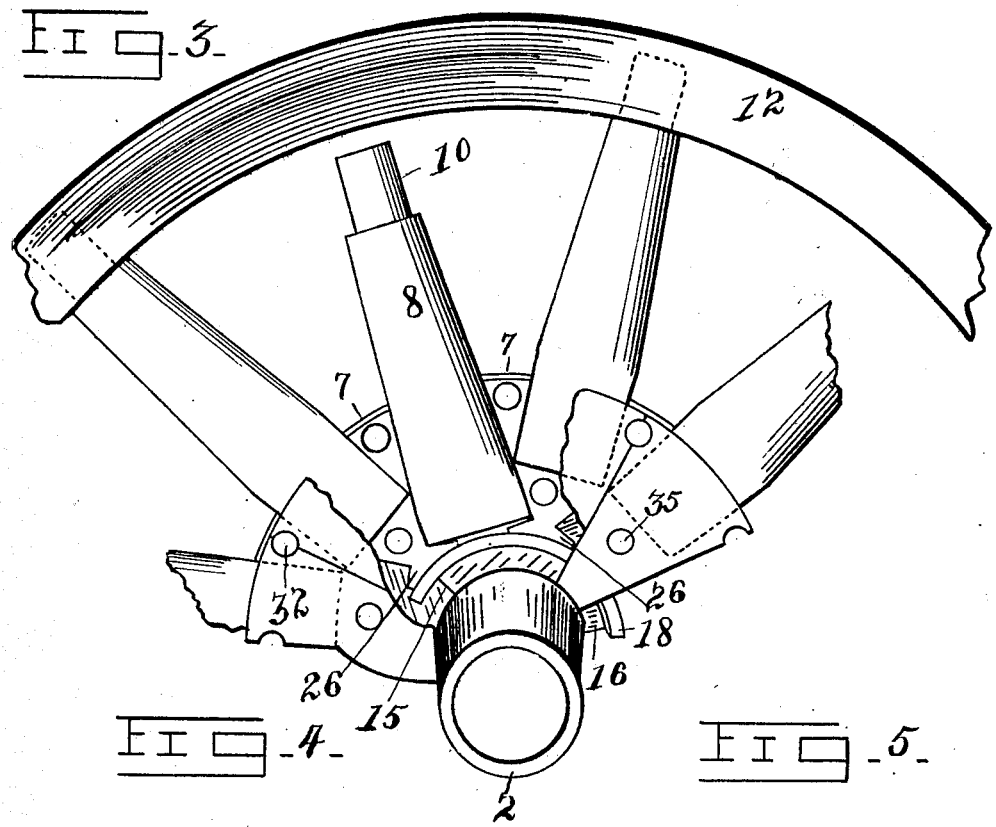
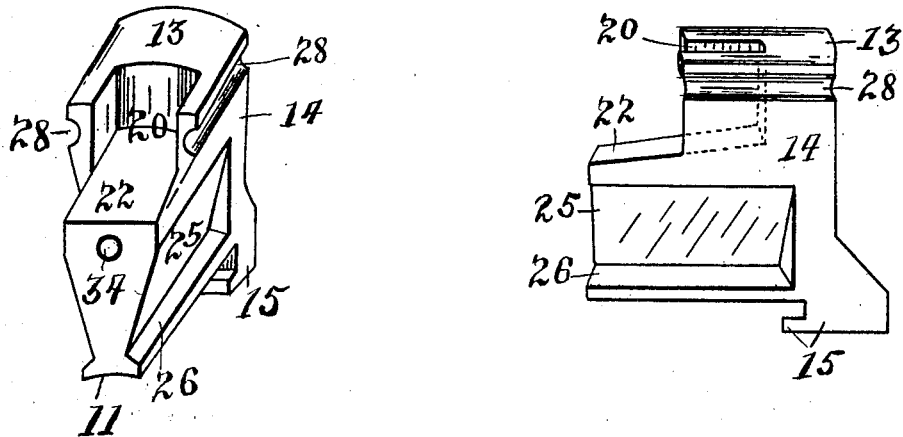
Witnesses
C. E. Page
WB Keogh
Inventors
Matthias J. Adams
Peter P. Adams
By
M. M. Cady
Attorney

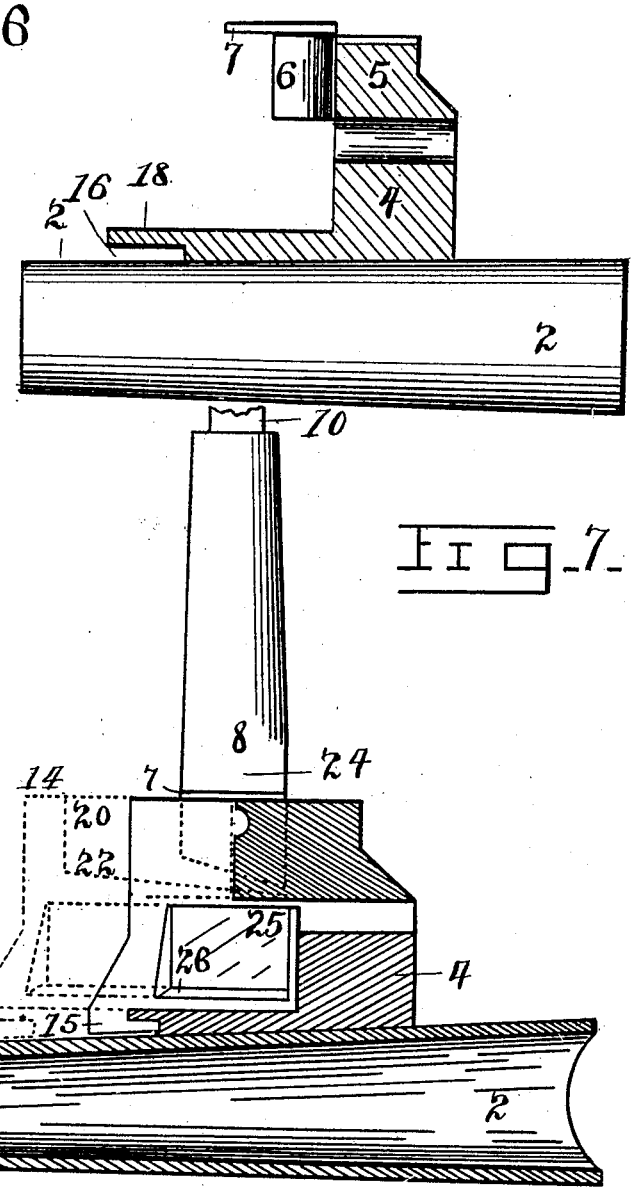

UNITED STATES PATENT OFFICE.

MATTHIAS J. ADAMS AND PETER P. ADAMS, OF TURKEY RIVER, IOWA.

WHEEL.

No. 916,402.      Specification of Letters Patent.      Patented March 30, 1909.

Application filed March 25, 1908. Serial No. 423,271.

*To all whom it may concern:*

Be it known that we, MATTHIAS J. ADAMS and PETER P. ADAMS, citizens of the United States, residing at Turkey River, in the county of Clayton and State of Iowa, have invented certain new and useful Improvements in Wheels, of which the following is a specification.

Our invention relates to vehicle wheels and the object is to so construct and assemble the various parts of a wheel that the spokes may be made of the exact size and shape desired before they are placed in position in the hub.

A further object is to assemble the spokes in the felly without any strain upon either the spokes or felly and then to withdraw any spoke without removing the tire or the felly and replace a spoke without disturbing any other spoke or removing the tire or felly.

It consists essentially in setting each spoke on an individual block and removably uniting said block to the axle box and hub of the wheel, whereby each spoke is forced into engagement with the felly and hub and is provided with a seat which holds the spoke in the hub and felly.

The following specification will set out in detail the mode of construction and the manner of assembling when read in connection with the drawings accompanying the same and forming a part hereof.

Figure 1, is an inner end view of the wheel and hub with part cut away. Fig. 2, is a view from the opposite end of Fig. 1, with the felly and part of the spokes cut away. Fig. 3, is also an end view with part cut away, showing part of the spokes in engagement with the hub and felly and one spoke in position to be inserted in the felly and secured in the hub. Fig. 4, is a perspective view from one corner of the securing and seating block. Fig. 5, is a side elevation of the block, shown in Fig. 4. Fig. 6, is a side elevation of Fig. 1, with the blocks, spokes and felly removed, showing the hub box, the body of the hub and one of the partitions. Fig. 7, is a part section and part perspective view of the box, with the hub and block and one of the spokes, and showing in dotted lines, the position of the block before it is inserted in position in the hub to sustain the spoke.

Like characters of reference denote corresponding parts in each of the figures.

Referring to the drawings, 2 designates the hub-box, and 4, the body of the hub, which are preferably made integral of cast or malleable steel. The inner face of the hub is provided with the same number of V shaped partitions or wedges 6 as there are spokes and each spoke is set between these partitions in a mortise 5. Over the top of the partitions between the spokes is a thin plate 7 which plate fits snugly between the spokes and prevents all moisture and dust from gaining access to the center of the hub. The spokes 8 are rectangular in shape where they enter the hub and continue in such shape for a short distance then gradually taper toward their outer ends and are each provided with the usual tenon 10 which enters a mortise in the felly 12. The object of this construction is to make the spoke heavier and stronger where it is most needed, near to and within the hub.

For the purpose of forcing to position and furnishing a seat for the spokes, whereby they will always be removably held in rigid and complete engagement with the felly and hub there are provided blocks 14, as shown in Figs. 4 and 5, one for each spoke. This block 14, is of wedge shape vertically being wider at the top than at the bottom and curved at the top 13, to conform to the oval of the hub and curved at the bottom 11 to conform with the hub-box 2. It is also provided on its outer end at the base with a hook 15 adapted to engage in a channel 16, beneath a flange 18 integral with the body of the hub.

The top 13 is recessed at 20 and cut away leaving a platform or spoke rest 22 of the length of the side of the spoke where it enters the hub, as shown in Figs. 4 and 7. The seat, or rest 22 is inclined from the inner end of the recess or mortise 20 to the outer end of the block and recessed or beveled for a short distance along both sides at 25, leaving a ledge 26 for the purposes presently to appear. Upon each side of the block, near the top, is a half circular groove or recess 28, which with a similar recess on the contiguous block 14, forms a bolt hole 30, through which a bolt 32 passes and aids in holding the two contiguous blocks and spokes rigidly against the hub. There is also provided, in the central part of the block beneath the seat 22 a bolt hole 34 through which is passed a bolt 35 which also holds the block and spoke in engagement with the body of the hub.

The mode of assembling and the operation of our device is substantially as follows: A spoke 8 is placed with its tenon 10 in the mortise of the felly 12 then the block 14 is inserted under the base of the spoke with the rest 22, which is constructed on an incline against the beveled or inclined surface of the lower end of the spoke, then as the block is forced in, the inclined surface 22 of the block will engage the beveled or inclined surface of the spoke at the base and force it into its position in the felly and also the hook 15 into engagement with the groove 16 beneath the ledge 18 and then the bolt 35 is passed through the hole in the block 14 and through the body of the hub and held there preferably by nuts on the end of the bolt or by riveting. By this means the block 14 is brought solidly against the spoke with the spoke in the recess 20 and resting upon the seat 22 and also in the recess 5 between the partitions 6. Then another spoke is secured in the same manner and the bolt is passed through the recess 28 between two contiguous blocks 14 also through the body of the hub and secured thereon, with the plates 7 covering the space between the two spokes and the partitions 6 also part of the block, thus preventing any moisture getting in either between the spokes and partitions 6 or between the blocks and the partitions. This mode of assembling is continued until all of the spokes and blocks are in and when a tire is placed thereon the wheel is complete.

If a spoke be broken or becomes loose, then all that is necessary to be done, is to remove the block 14 beneath the injured spoke, by removing the two bolts 32 and the central bolt 35. The new spoke to replace the broken spoke, after its block is removed, is inserted in the space between the blocks beneath the contiguous spokes on either side in the recesses 25 and sets on the ledges 26 of the two blocks as shown in Fig. 3. This will bring the tenon 10 of the spoke below the felly. The spoke may be lifted up and bring the tenon 10 into engagement with the mortise in the felly 12. Then the seating block 14 is inserted beneath the spoke and fastened as before described thereby forcing the new spoke into rigid engagement with the felly, hub and block and securely holding it in its position.

It will be seen, that, in order to replace a broken spoke, all that is necessary is to remove the block 14 without disturbing any other part of the wheel even the tire or felly.

It will also be observed, that the spokes may be made of the exact size and there will be no waste in the material in the construction of the spoke and no waste when the spoke is placed in position, as is usual where the spoke is driven in to the mortise. Further there will be no springing or weakening of the spoke when the felly is put on for the spoke is inserted in its position in the felly and need not be sprung to engage the felly as is usual where the spokes are first inserted in the hub and then the felly is subsequently brought into engagement with the spokes. It will also be observed that the wheel may be made exceedingly cheap, as the body of the hub and the hub-box may be cast integral and the blocks may also be cast and it will not require an expert to manufacture after the castings are finished.

Having now described our invention what we claim is:—

1. In a wheel, a felly, a hub, spokes, an individual block for each spoke provided with an inclined recess in which the base of the spoke is seated, means connected with each block adapted to engage a channel in the body of the hub and removably hold the block in engagement with the hub, and means engaging the block and the body of the hub for forcing the block against the base of the spoke and the spoke into rigid engagement with the felly and hub and removably holding the spoke upon the block in such engagement.

2. In a wheel, a felly, a hub, spokes, a block for each spoke provided with an inclined recess in which the spoke is seated and when all of said blocks are in position in the wheel they form one end of the hub, and means for forcing each block beneath the base of its respective spoke and the spokes into engagement with the hub and felly and holding said spokes in such engagement.

3. In a wheel, a felly, a hub, spokes having their lower ends beveled or inclined, a block for each spoke provided with an inclined recess forming a seat for the spoke and all of the blocks forming one end of the hub, means for forcing the inclined seat of the block against the inclined end of the spoke to cause the spoke to engage the felly and to removably hold the spoke in such engagement, and a plate secured to the body of the hub and projecting between the spokes over the blocks.

4. In a wheel, a felly, a hub, spokes having their lower ends beveled or inclined and largest near their lower ends where they enter and are within the hub, an individual block for each spoke having a recess for the spoke and an inclined seat for the spoke, and means for forcing the inclined seat of the block against the inclined end of the spoke to cause the spoke to enter the recess in the block and into engagement with the felly and hub and removably holding the spoke in such engagement.

5. In a wheel, a felly, a hub, spokes, a block for each spoke provided with an inclined seating surface for the spoke and having a recess in each side, and means for forcing said block against the base of the spoke to cause the spoke to engage the felly and hub and removably holding said spoke in such engagement.

6. In a wheel, a felly, a hub, spokes having an inclined base, a block for each spoke provided with an inclined seat for the spoke and having a beveled recess in each side with a ledge at the base of said recesses in which recess and upon said ledge the spoke is located preparatory to its insertion in the wheel, and means for forcing the inclined seat of the block against the inclined end of the spoke to cause the spoke to engage the hub and felly and removably holding the spoke in such engagement.

7. In a wheel, a felly, a hub provided with a flange, spokes, a seating block one for each spoke and provided with a hook adapted to engage the flange of the hub, and means for forcing the block against the base of the spoke and the spoke into engagement with the felly and the hook on the block into engagement with the flange on the hub.

8. In a wheel, a felly, spokes, a hub one end of which is formed integral and the other end formed of seat blocks, one for each spoke, and means for forcing the spokes into engagement with the felly and within the hub and removably holding the spokes on the blocks in their forced position.

9. In a wheel, a felly, spokes having their lower ends inclined, a hub composed one end of a single piece and the other end of seating blocks one for each spoke and each block having an inclined seat adapted to engage the inclined end of the spoke, and means engaging the blocks and the body of the hub for forcing the spoke into engagement with the felly and hub and removably holding the spokes in a fixed position.

10. In a wheel, a felly, spokes, a hub made with one end integral and provided with a flange and the other end formed of separate seating blocks one for each spoke and each provided with a hook, and means for forcing the blocks with their hooks into engagement with the flange on the hub and holding the spokes in engagement with felly and in the hub and the parts of the hub in engagement with each other.

In testimony whereof we affix our signatures, in presence of two witnesses.

MATTHIAS J. ADAMS.
PETER P. ADAMS.

Witnesses:
PHILIP B. HARD,
R. A. MEUTH.